(12) United States Patent
Prystupa et al.

(10) Patent No.: US 12,064,844 B2
(45) Date of Patent: Aug. 20, 2024

(54) PERFORMING OPERATIONS ON A WORKPIECE USING ELECTROMAGNETIC FORCES

(71) Applicant: 11885111 Canada Ltd., Winnipeg (CA)

(72) Inventors: David Allan Prystupa, Pinawa (CA); John Stephen Pacak, Winnipeg (CA); Peter Condie Nell, Winnipeg (CA)

(73) Assignee: 11885111 Canada Ltd., Winnipeg (CA)

(*) Notice: Subject to any disclaimer, the term of this patent is extended or adjusted under 35 U.S.C. 154(b) by 301 days.

(21) Appl. No.: 17/166,207

(22) Filed: Feb. 3, 2021

(65) Prior Publication Data

US 2021/0252662 A1 Aug. 19, 2021

Related U.S. Application Data

(60) Provisional application No. 62/978,675, filed on Feb. 19, 2020, provisional application No. 62/978,671, (Continued)

(51) Int. Cl.
*B33Y 10/00* (2015.01)
*B22F 12/57* (2021.01)
(Continued)

(52) U.S. Cl.
CPC ............. *B24B 1/005* (2013.01); *B22F 12/57* (2021.01); *B22F 12/58* (2021.01); *B22F 12/84* (2021.01);
(Continued)

(58) Field of Classification Search
CPC .......... B22F 10/20; B22F 10/22; B22F 10/50; C23C 4/02; C23C 4/06; C23C 4/067;
(Continued)

(56) References Cited

U.S. PATENT DOCUMENTS 3,892,506 A * 7/1975 Dann ...................... B22F 10/50
425/174.8 E
3,989,164 A 11/1976 Hager
(Continued)

FOREIGN PATENT DOCUMENTS

| GB | 1084496 | 9/1967 |
|---|---|---|
| JP | 2006272520 | 10/2006 |
| WO | WO2018018155 | 2/2018 |

*Primary Examiner* — Michael P Wieczorek
(74) *Attorney, Agent, or Firm* — Adrian D. Battison; Ryan W. Dupus; Ade & Company Inc.

(57) ABSTRACT

This invention relates to a method for feeding magnetic objects in a stream which are singulated each from the next in a supply path where there is provided a series of electromagnets which provides a sequence of magnetic fields along the supply path to direct the magnetic objects by the series of electromagnets in a required direction toward a required location. The method can be used for carrying out an operation on a workpiece by interaction of the objects as individual tools with the workpiece including sorting, shaping, material removal, physical modification, chemical modification, addition of material cutting, polishing, abrading peening and addition of energy. A lubricant/purge material is supplied to the workpiece to arrive at different times relative to the tools.

34 Claims, 7 Drawing Sheets

Related U.S. Application Data filed on Feb. 19, 2020, provisional application No. 62/978,680, filed on Feb. 19, 2020, provisional application No. 62/969,983, filed on Feb. 4, 2020.

(51) Int. Cl.
| | | |
|---|---|---|
| *B22F 12/58* | (2021.01) | |
| *B22F 12/84* | (2021.01) | |
| *B24B 1/00* | (2006.01) | |
| *B24B 31/10* | (2006.01) | |
| *B33Y 50/00* | (2015.01) | |
| *B33Y 30/00* | (2015.01) | |
| *B33Y 80/00* | (2015.01) | |

(52) U.S. Cl.
CPC ............ *B24B 31/102* (2013.01); *B33Y 10/00* (2014.12); *B33Y 30/00* (2014.12); *B33Y 50/00* (2014.12); *B33Y 80/00* (2014.12)

(58) Field of Classification Search
CPC .. C23C 4/08; C23C 4/073; C23C 4/12; C23C 4/123; C23C 4/137; C23C 24/00; C23C 24/04; C23C 24/08; B33Y 10/00; B33Y 70/00; B33Y 70/10
See application file for complete search history.

(56) References Cited

U.S. PATENT DOCUMENTS

| | | | |
|---|---|---|---|
| 4,113,142 | A | 9/1978 | Ryzhov et al. |
| 6,492,651 | B2 * | 12/2002 | Kerekes ................. B22F 10/80 |
| | | | 356/3.01 |
| 7,631,816 | B2 * | 12/2009 | Jabado ................. B05B 7/1626 |
| | | | 118/308 |
| 9,969,566 | B1 | 5/2018 | Payan et al. |
| 2006/0272928 | A1 | 12/2006 | Kritzinger |
| 2012/0020828 | A1 * | 1/2012 | Suhonen ................... C23C 4/06 |
| | | | 420/431 |
| 2017/0073170 | A1 | 3/2017 | Kakuho et al. |
| 2017/0128927 | A1 * | 5/2017 | Garella ................. B01J 8/1809 |
| 2017/0232519 | A1 * | 8/2017 | Pan ......................... B22F 12/53 |
| | | | 425/3 |
| 2018/0290381 | A1 * | 10/2018 | Volkov ................. B29C 64/188 |
| 2018/0359843 | A1 * | 12/2018 | Elfsberg ................... B05B 7/22 |

* cited by examiner

PERFORMING OPERATIONS ON A WORKPIECE USING ELECTROMAGNETIC FORCES This application claims the benefit under 35 USC 119 (e) of Provisional Application 62/969,983 filed Feb. 4 2020 related to PERFORMING OPERATIONS ON A WORKPIECE USING ELECTROMAGNETIC FORCES, the disclosure of which is incorporated herein by reference.

This application claims the benefit under 35 USC 119 (e) of Provisional Application Provisional Application 62/978,671 filed on Feb. 19 2020 and related to FIELD PROGRAMMABLE ANALOG ARRAY, the disclosure of which is incorporated herein by reference.

This application claims the benefit under 35 USC 119 (e) of Provisional Application Provisional Application 62/978,675 filed on Feb. 19 2020 and related to MAGNETIC PLATFORM FOR SAMPLE ORIENTATION, the disclosure of which is incorporated herein by reference This application claims the benefit under 35 USC 119 (e) of Provisional Application Provisional Application 62/978,680 filed on Feb. 19 2020 and related to FIELD PROGRAMMABLE FLUIDIC ARRAY, the disclosure of which is incorporated herein by reference.

This application is related to Method and Apparatus for Singulating Particles in a Stream as described in PCT Application PCT/CA2017/050907 published on Feb. 1, 2018 as WO 2018/018155 which corresponds to U.S. application Ser. No. 15/662,794, the disclosures of which are incorporated herein by reference.

SUMMARY OF THE INVENTION

According to the present invention there is provided a method for feeding magnetic objects in a stream from a massed supply of the objects, the method comprising:
  supplying the massed supply of the magnetic objects;
  forming the magnetic objects into a moving stream of the magnetic objects which are singulated each from the next;
  wherein the magnetic objects are fed from the moving stream to a supply path;
  wherein there is provided a series of electromagnets along the supply path operated to provide a sequence of magnetic fields along the supply path that exert a force on the magnetic objects;
  and directing the magnetic objects by the series of electromagnets in a required direction toward a required location.

The arrangement herein may particularly be used in a method for performing one or more operations on a workpiece by translating and orienting singulated magnetic objects with electromagnetic forces. The workpiece may be a magnetic object or a non-magnetic object. The operations on a workpiece the can comprise one or more of the group including sorting, shaping, material removal, physical modification, chemical modification, addition of material cutting, polishing, abrading peening and addition of energy.

The sorting operation takes singulated magnetic objects and changes at least one dynamical property based on a measured property of each magnetic object wherein the dynamical property is one of position, velocity or orientation.

The shaping and physical modification operations utilize the momentum and kinetic energy of magnetic objects to shape a workpiece by any combination of material removal, plastic deformation and altering the arrangement of atoms within the workpiece.

For material addition and chemical modification operations, magnetic objects transport material or energy to a location on the workpiece. The material may be a material to add to the workpiece or the material may be a catalyst. The energy may be added by generating and/or directing photons to a location on the workpiece, by supplying electrical energy to a location on the workpiece, by supplying chemical energy to a location on the workpiece, or by supplying thermal energy to a location on the workpiece.

In accordance with an important feature of the invention which can be used independently with any of the following features, there is provided a singulation means that supplies a plurality of magnetic objects separated one from the next. The method herein can be used with the arrangements for singulating objects disclosed and claimed in the above cited PCT Application PCT/CA2017/050907. Thus, as explained in the above publication, the magnetic objects pass through a duct which is shaped and arranged so that the magnetic objects or particles are accelerated as they pass from the inner end to the outer end so as to cause the particles to be aligned one after the other in a row as they move toward the outer end. Thus the term "singulation" requires that the magnetic objects are arranged in a row, that is a single row, where each magnetic object in the row is spaced form the one before and the one after.

The invention operates on objects that experience a force or torque in an applied magnetic field. The term "magnetic object" used throughout this document has the meaning that the object has interaction energy with an applied magnetic field that is greater than kT, where k is the Boltzmann constant and T is the temperature in Kelvin: that is the interaction energy with an applied magnetic field is greater than the thermal energy. Preferably the interaction energy is much greater than the thermal energy at room temperature. This will generally be true for ferromagnetic materials containing ferromagnetic elements such as Fe, Ni, and Co, as well as materials containing rare earth elements most notably Gd, Nd, and Sm. However for objects comprised of paramagnetic or diamagnetic materials that interact weakly with an applied magnetic field the temperature may be lowered to a point at which the interaction energy becomes larger than the thermal energy.

The term "composite magnetic object" refers to an object comprised of a plurality of portions wherein at least two portions have different composition and wherein the interaction with an external magnetic field of a portion with a first composition is different than the interaction with an external magnetic field of a portion having a second composition.

The term "complex magnetic object" refers to objects comprised of a plurality of portions wherein at least two portions have different magnetic moments.

The term "complex composite magnetic object" refers to objects comprised of a plurality of portions wherein at least two portions are comprised of different materials with different interactions with an external magnetic field and wherein at least two portions have different magnetic moments.

The term "magnet" refers to a permanent magnet, an electromagnet, or a combination of both known is some literature as an electro-permanent magnet.

The term "electromagnet" used throughout refers to a magnet comprised of at least one wire wherein the magnetic field of the magnet changes when electrical current flows in the wire. Hence the combination of a permanent magnet and a wire is deemed to be an electromagnet within the scope of this document.

In accordance with an important optional feature of the invention which can be used independently with any of the above or following features, there is provided a magnetic orienting device for orienting selected magnetic objects in response to the detecting of at least one orientation parameter of the singulated objects. The magnetic orienting device comprises a detector for measuring position and orientation of magnetic objects and at least one electromagnet for each degree of freedom of the magnetic objects, wherein each electromagnet is positioned to deliver magnetic flux to at least a portion of the magnetic objects from a different direction.

Preferably the electromagnets are spaced at equal solid angles about the center of mass of the magnetic object at any instant in the reorientation process, or alternately at equal intervals surrounding a path followed by the magnetic object. The magnetic moment of the magnetic object experiences a torque toward alignment with an applied magnetic field.

Preferably the direction of the applied magnetic field generated by the electromagnets makes an angle of 30 degrees or less with the magnetic moment of the magnetic object. In cases where a change in orientation of more than 30 degrees is required, the magnetic field may be applied in a sequence of steps of 30 degrees or less wherein the magnetic moment of the magnetic object approaches alignment with the applied magnetic field prior to the following step.

In an important embodiment the direction and magnitude of the applied magnetic field is determined to provide the force required by a dynamical calculation at each of a plurality of steps. In an important embodiment, the dynamics of the magnetic object include both translation and rotation.

In accordance with an important optional feature of the invention which can be used independently with any of the above or following features, there is provided a magnetic diverting device for diverting selected magnetic objects in response to the detecting of at least one parameter of the singulated magnetic objects. The detected parameter may be for example orientation or a quality parameter. In this embodiment a path is selected based on a measured parameter of the magnetic object and a magnetic field gradient oriented substantially along the selected path is generated to attract the object to and along the selected path. The magnetic field may be generated with a single electromagnet. Preferably at least two electromagnets are used to provide a field component transverse to the path. This featured is useful to adapt to objects incident from different directions.

In accordance with an important optional feature of the invention which can be used independently with any of the above or following features, there is provided a magnetic diverting device for diverting selected magnetic objects along different paths in response to a user input. The magnetic diverting device comprises a detector, a control device, and one or more electromagnets per different path arranged to generate longitudinal magnetic field components along the path axis and magnetic field components transverse to the path axis. The detector communicates the object velocity and position to the control device and the control device determines the required magnetic forces to divert an object to a selected path with a dynamics calculation. The control device then activates one or more electromagnets to provide the required magnetic field. When activated, the longitudinal magnetic field gradient attracts objects along the path axis and the transverse gradient functions to reduce object velocity transverse to the path axis. For example, three tools may be sharing a common stream of singulated fasteners for different operations and a magnetic diverting device diverts fasteners to each tool in order of priority in response to a signal from each tool that the tool is ready to receive a fastener. The user may for example divert a first 100 objects along a first path to fill a first package and subsequently divert a second 100 objects along a second path to fill a second package.

In accordance with an important optional feature of the invention which can be used independently with any of the above or following features, there is provided a magnetic translation device for translating magnetic objects along a path. The magnetic translation device consists of a control device and an array of electromagnets arranged at positions along the path that are activated in sequence by control device to attract the object toward each successive electromagnet position. In some embodiments the array of electromagnets operates analogous to a stepper motor insofar as the object arrives at discrete positions corresponding to the potential energy well of a first electromagnet before the first electromagnet is switched off and a second electromagnet is switched on. This mode is useful for delivering objects to the end of the array at regular intervals.

In another embodiment, the array of electromagnets operates analogous to a linear motor insofar as a first electromagnet attracting an object in a sequence is switched off before the object arrives at the first electromagnet potential energy minima and a subsequent electromagnet is switched on. This mode can produce more uniform velocity and acceleration. This feature is particularly useful as an alternative to pneumatic transport of magnetic objects as the energy efficiency of electromagnetic transport is typically greater than the energy efficiency of pneumatic transport. In one example, magnetic objects may be singulated by passing along a rotating duct in the direction of increasing radius from the axis of rotation as described in the above cited PCT Application PCT/CA2017/050907. The singulated object may subsequently be brought back to an axial position for use by a tool by activating an array of electromagnets.

In accordance with an important optional feature of the invention which can be used independently with any of the above or following features, there is provided a means for adding material to a portion of the magnetic object wherein the position and orientation of the magnetic object are controlled by magnetic fields and wherein the material to be added depends at least in part on a measured property of the magnetic object. The added material may for example be a lubricant added to the head of a screw, a marking material added to the head of a bolt, a plurality of structural materials, or a material to be tested.

In accordance with an important optional feature of the invention which can be used independently with any of the above or following features, there is provided a radiation device that directs a radiation toward a portion of the magnetic object. The radiation may be photons, electrons, neutrons, atoms, molecules or ions.

In accordance with an important optional feature of the invention which can be used independently with any of the above or following features, there is provided a detector array operable to measure at least one property of a magnetic object. The detector array may include one element or a plurality of elements. The detector array may for example measure a radiation scattered, reflected or emitted from a portion of the magnetic object in response to radiation incident on the magnetic object and the measured radiation is analyzed to provide information about material of said portion of the magnetic object. The detector array may for example measure the bidirectional reflectance function of one surface of a magnetic object for different angles of incidence. Each detector of the array may be a spectrometer which measures the intensity of radiation received as a function of energy, frequency or wavelength. The detector array for example may be a high speed camera that measures the position, orientation of a magnetic object as a function of time and the camera frames are analyzed to provide information about the velocity and angular velocity of the magnetic object.

In accordance with an important optional feature of the invention which can be used independently with any of the above or following features, there is provided a detector array operable to measure at least one property of a workpiece that is operated on by magnetic object. The detector array may include one element or a plurality of elements. The detector array may for example measure a radiation scattered, reflected or emitted from a portion of the workpiece in response to radiation incident on the workpiece and the measured radiation is analyzed to provide information about material of said portion of the workpiece. The detector array may for example be an acoustic array that measures the shape of a cavity in a workpiece wherein the cavity is produced by a magnetic object removing material from the interior of a workpiece. The detector array may for example measure the x-ray diffraction pattern of a location on the workpiece and the diffraction pattern is analyzed to determine the crystal structure and orientation. The detector array may for example measure magnetic moments on a workpiece and infer the orientation and position of the workpiece from the measured magnetic moments.

In an embodiment that may be used in combination with any of the preceding or following embodiments, radiation from radiation device may interact with material of a magnetic object to heat, melt, anneal, fuse or oblate a portion of the magnetic object.

In accordance with an important optional feature of the invention which can be used independently with any of the above or following features, there is provided a magnetic diversion device for directing magnetic objects along a ballistic trajectory in response to the detecting of at least one parameter of the singulated magnetic objects. The magnetic diversion device applies a magnetic field in a region proximate to the end of a duct that acts on a magnetic object traveling in a duct to alter the velocity of the magnetic object. The velocity of the magnetic object determines a ballistic trajectory of the magnetic object after the magnetic object leaves the region of the magnetic field. The detected parameter may be for example a quality parameter of the magnetic object and the exit velocity (and ballistic trajectory) is chosen such that magnetic objects with different quality parameters fall in different bins. The magnetic object may for example be an ore particle.

In accordance with an important optional feature of the invention which can be used independently with any of the above or following features, there is provided a magnetic diversion device for directing magnetic objects along a ballistic trajectory in response to a user input. The magnetic diversion device operates as described above, except that the ballistic trajectory is chosen by the user. For example, the user may select a ballistic trajectory that causes the magnetic object to impact a particular location on another target object or workpiece at a particular angle of incidence and velocity.

In accordance with an important optional feature of the invention which can be used independently with any of the above or following features, a means to cause relative motion between the magnetic object path and workpiece is provided. The magnetic object path is generated by the magnetic object orientation means, the magnetic object translation means, or a combination thereof. In some embodiments the relative motion is rotational, in some embodiments the relative motion is translational, and in some embodiments the relative motion is both rotational and translational. In some embodiments the external magnetic field translates and/or rotates a magnetic object within a defined volume containing at least part of a workpiece. In some embodiments the workpiece further translates and/or rotates relative to the defined volume of the external magnetic field.

In accordance with an important optional feature of the invention which can be used independently with any of the above or following features, there is provided a means to control the temperature of a plurality of locations in a workpiece so that each location may have a different temperature.

In an embodiment that may be used in combination with any of the preceding or following embodiments, the magnetic object is an abrasive and the impact of the magnetic object with a target object or workpiece removes at least some material from the target object or workpiece.

In an embodiment that may be used in combination with any of the preceding or following embodiments, the magnetic object impact alters a property of the target object or workpiece such as for example work hardening of a metal surface. Magnetic objects may for example harden a first spatial region of a workpiece and not harden a second spatial region of a workpiece where greater elasticity is desired. In some embodiments, the magnetic object impact carries out a machining operation on the workpiece which deforms and/or remodels the shape of the target object.

In an embodiment that may be used in combination with any of the preceding or following embodiments, the magnetic object is a cutting tool and the impact of the cutting tool removes selected material from the target object. In this embodiment the cutting tool is singulated and oriented by methods discussed above. The cutting tool is inspected by a detector during the orientation process and parameters relating to the suitability of the tool are measured. For example, the sharpness of the cutting edge of a cutting tool may be examined to determine whether the cutting edge is sharp or dull. Depending on the measured parameters, the cutting tool may be either diverted to a waste bin by methods discussed above or diverted to a magnetic translation device that operates to increase the velocity of the cutting tool. Finally, the cutting tool is directed on a ballistic trajectory toward a location on a target object where material is to be removed. The cutting tool may subsequently be recovered and directed to the supply duct of the singulation apparatus for re-use. This embodiment has four advantages relative to conventional milling operations. Firstly, it is possible to ensure that the cutting edge is always sharp either by inspection or by using a fresh cutting tool for each operation. Secondly, the reach of the tool is not limited by the length of a tool shaft. This feature is particularly important for small diameter tools where shaft breakage is a problem. Thirdly, the cutting tool does not overheat because it is used for only one cut. Fourth, the effect on a workpiece of each interaction with a magnetic object tool can be measured and the momentum of subsequent magnetic object tools can be adjusted interactively to produce a desired effect on the workpiece. This embodiment is similar to a water jet cutter insofar as the cutting action on a workpiece is achieved with a stream of particles. A water jet cutter has wear surfaces that require maintenance at a cost in lost production time and replacement parts. These costs are avoided in the magnetic cutting machine of the present embodiment since there are no wear surfaces. Further, this embodiment allows more precise cuts than a water jet cutter because the cutting tools are individually directed. Unlike a laser cutter, the magnetic cutting machine of the present embodiment can cut straight edges and is not limited by workpiece material or thickness.

In an embodiment that may be used in combination with any of the preceding or following embodiments, a sequence of magnetic objects is applied to a location on a workpiece and a sequence of fluid streams is applied proximate to the workpiece location wherein the magnetic objects arrive at the workpiece at different times than the fluid streams. The fluid may be a gas or a liquid. The magnetic objects may for example cut, polish, abrade or perform a peening operation on the workpiece location. The fluid stream may for example provide cooling, lubrication and chip removal proximate to the workpiece location. The time of arrival of the magnetic objects and fluid streams at, or proximate to the workpiece location is temporally separated so that the momentum of the magnetic objects is not altered by the momentum of the fluid streams prior to impact with the workpiece location. The fluid stream may for example be modulated for example by a chopper wheel that periodically blocks flow. A sensor proximate to the chopper wheel communicates the chopper state to the control means and the control means generates signals to the magnetic array causing magnetic objects to arrive at different times than the fluid streams. For example, the control means may set the phase and angular velocity of the chopper wheel such that the magnetic objects and fluid streams arrive at a workpiece location at different times. For example, the control means may activate a valve regulating a fluid stream such that the magnetic objects and fluid streams arrive at a workpiece location at different times.

In an embodiment that may be used in combination with any of the preceding or following embodiments, the complex magnetic object includes a set of magnetic moments that function as a magnetic bearing to constrain the motion of the complex magnetic object to rotation about an axis determined by the direction of an external magnetic field at the position of said magnetic bearing moments.

In an embodiment that may be used in combination with any of the preceding or following embodiments, the complex magnetic object includes a set of magnetic moments that function to constrain the position of the center of mass of the complex magnetic object in response to an external magnetic field at the position of said set of magnetic moments wherein the external magnetic field is temporally adjusted to generate a force on the magnetic object that opposes displacement from the constrained position.

In an embodiment that may be used in combination with any of the preceding or following embodiments, the complex magnetic object includes a set of magnetic moments that function to produce a force to translate the complex magnetic object.

In an embodiment that may be used in combination with any of the preceding or following embodiments, the complex magnetic object includes a set of magnetic moments that function to produce a torque to rotate the complex magnetic object.

In an embodiment that may be used in combination with any of the preceding or following embodiments, the magnetic object is added in an additive process to the target object or workpiece at a selected location.

In an embodiment that may be used in combination with any of the preceding or following embodiments, the composite magnetic object to be added comprises a plurality of portions that interact strongly with an external magnetic field and serve to position and orient the object as a whole embedded within a material that interacts weakly with an external magnetic field. For example the composite magnetic object may be comprised of silica with embedded iron flakes.

In an embodiment that may be used in combination with any of the preceding or following embodiments, a composite magnetic object is directed on a path to a selected location of a target or workpiece with an external magnetic field wherein a portion of the composite magnetic object is added to the target or workpiece and a portion of the composite magnetic object is separated and directed along a different path.

In an embodiment that may be used in combination with any of the preceding or following embodiments, the composite magnetic object comprises a first portion that interacts strongly with an external magnetic field and a second portion that interacts weakly with an external magnetic field, and a third portion that forms a link between the first portion and the second portion, wherein the third portion is comprised of a material that can be removed by an operation and wherein the first portion and second portion travel independently along different paths after the operation. For example, a composite magnetic object may be comprised of a ferrite bead and a silica glass bead linked with an adhesive that is removed by application of heat and the silica bead is added to a workpiece at a selected location and the ferrite bead is directed to a recycle container.

In an embodiment that may be used in combination with any of the preceding or following embodiments, a composite magnetic object comprises a first portion that encloses a second portion in the absence of an applied magnetic field and does not enclose a second portion in the presence of an applied magnetic field wherein the first portion interacts strongly with an external magnetic field and wherein the second portion may travel on at least one path independently of the first portion.

In an embodiment that may be used in combination with any of the preceding or following embodiments, a composite magnetic object comprises a first portion that encloses a second portion in the presence of a first applied magnetic field and does not enclose a second portion in the presence of a second applied magnetic field wherein the first portion interacts strongly with an external magnetic field and wherein the second portion may travel on at least one path independently of the first portion.

In an embodiment that may be used in combination with any of the preceding or following embodiments, a composite magnetic object comprises a first portion that interacts strongly with an external magnetic field enclosed by a second portion that interacts weakly with an external magnetic field wherein the first portion is separable from the second portion by an operation that adds thermal energy. For example, the composite magnetic object may be an iron bead enclosed by a chalcogenide glass that is directed on a path to a location of a target or workpiece for an additive process by an external magnetic field. Application of heat causes the viscosity of the chalcogenide glass to decrease such that the iron bead can be attracted in a different direction with a second external magnetic field. Due to the reduced viscosity of the chalcogenide glass the iron bead passes through the chalcogenide glass while the momentum of the chalcogenide glass causes it to continue along a path for an additive process at a target or workpiece. Preferably the iron bead is extracted from the heated low viscosity glass in a direction opposite to the momentum of the low viscosity glass such that the direction of the low viscosity glass is not altered. In this example the Curie temperature of the iron bead is 1043 K and the glass transition temperature of the chalcogenide glass is 423 K. In general the Curie temperature of the first portion must be higher than the glass transition temperature of the second portion.

In an embodiment that may be used in combination with any of the preceding or following embodiments, a composite magnetic object comprises a first portion that interacts strongly with an external magnetic field and partially encloses a second portion that interacts weakly with an applied magnetic field wherein there is at least one direction the second portion can travel without contacting the first portion. For example, the composite magnetic object may be a cobalt cup containing a sapphire optic. The mouth of the cobalt cup is directed toward a location for an additive process by an applied magnetic field and the cup imparts momentum in that direction on the sapphire optic. A second magnetic field is applied that causes the cobalt cup to reverse direction without applying a force on the sapphire optic. The sapphire optic continues to the location on a target or workpiece for an additive process.

In an embodiment that may be used in combination with any of the preceding or following embodiments, the magnetic object or portion thereof is melted and subsequently added to a target object. The melting may occur in the duct, proximate to the duct exit, or proximate to the target object or workpiece. The magnetic object or portion thereof may be melted via induction by application of a radio frequency electric field. The object may be melted by thermal radiation by passage through a black body region. The object may be melted by laser radiation.

In an embodiment that may be used in combination with any of the preceding or following embodiments, drops of molten metal alloy are added to a target object or workpiece in a three-dimensional printing process. In other embodiments, the molten drops are optical materials, electronic materials, or polymer materials. The drop size and temperature can be manipulated to control the atomic structure of the deposited material. For example, the molten drop may be quenched to produce a metallic glass or annealed and cooled slowly to produce a crystalline structure. The cooling rate and thermal history for each molten drop or group of drops may be different so that different drops of the same atomic composition may have different crystalline ordering or may be amorphous. The temperature of the material in each drop or group of drops may be regulated both before and after addition to a workpiece. The temperature regulation of drop material may for example be radiative before addition to a workpiece and primarily conductive after addition to a workpiece. The composition of each molten drop may be different allowing the production of composite three-dimensional objects. For example, a gradient index optic may be fabricated by adding a sequence of drops with different refractive indices.

In an important embodiment that may be used in combination with any of the preceding or following embodiments, molten drops of material are added to a workpiece that comprises a single crystal seed and the material in the drops crystallizes to grow the single crystal.

In an embodiment that may be used in combination with any of the preceding or following embodiments, molten drops are added to a workpiece in the presence of an electric field to induce polarization and alignment of a crystallographic axis with the applied field during crystallization. The polarization and alignment of crystallographic axes may be varied throughout a three-dimensional structure in a controlled manner by this method. The effect can be used for example to fabricate piezoelectric elements with anisotropic properties. The effect can be used for example to fabricate optical elements with spatially varying anisotropic indices of refraction.

In an embodiment that may be used in combination with any of the preceding or following embodiments, molten drops are added to a workpiece in the presence of a magnetic field to induce a spatially varying magnetic moment in the target object. This method can be used for example to fabricate micro robots that change shape in response to an applied magnetic field.

In an embodiment that may be used in combination with any of the preceding or following embodiments, a plurality of materials are added to a workpiece wherein each material is conveyed by a magnetic object and the position and orientation of the magnetic object is controlled by an external magnetic field.

In an embodiment that may be used in combination with any of the preceding or following embodiments, a plurality of materials are added to a workpiece wherein each material has a different index of refraction and wherein each material is conveyed by a magnetic object and the position and orientation of the magnetic object is controlled by an external magnetic field. Materials with different refractive index can for example be assembled into three dimensional circuits for optical computing.

In an embodiment that may be used in combination with any of the preceding or following embodiments, a plurality of materials are added to a workpiece wherein each material has different electronic properties and wherein each material is conveyed by a magnetic object and the position and orientation of the magnetic object is controlled by an external magnetic field. Materials with different electronic properties can for example be assembled into three dimensional electrical circuits.

BRIEF DESCRIPTION OF THE DRAWINGS

One embodiment of the invention will now be described in conjunction with the accompanying drawings in which.

DETAILED DESCRIPTION

Figure 1:
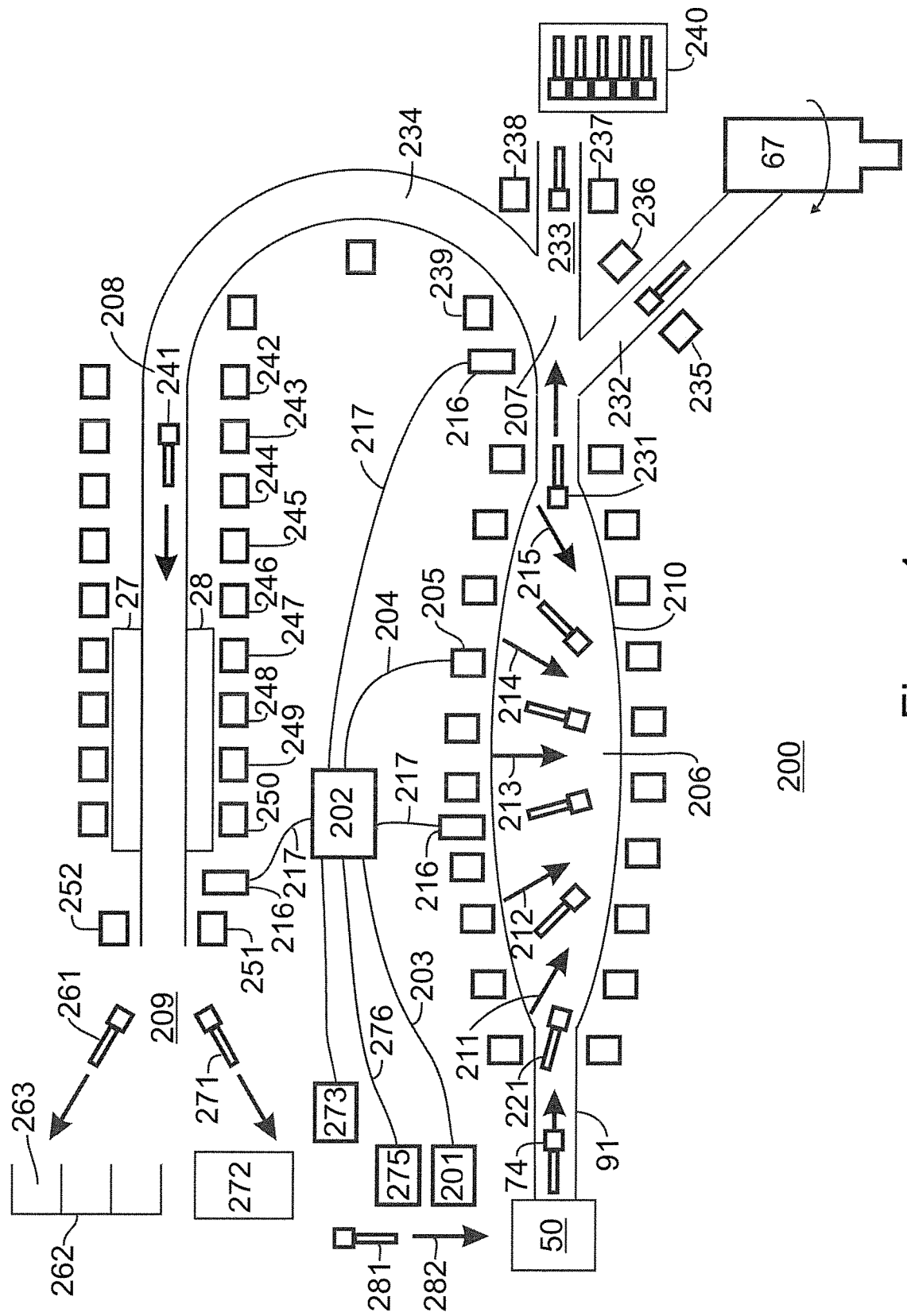
FIG. 1 is a schematic illustration of arrangements for orienting, diverting and translating magnetic objects.

The magnetic arrangement of the invention is indicated generally in FIG. 1 at 200. As shown schematically in FIG. 1, magnetic forces can be used to orient objects within a duct as shown in region 206, direct objects along different paths as shown in region 207, propel objects along a duct as shown in region 208, and direct objects along ballistic paths as shown in region 209. The features described may be used individually or in combination.

In FIG. 1 singulated magnetic objects 74 from singulation device 50 enter through duct 91. The position of each object is measured as a function of time by a sensor net comprised of one or more sensors positioned proximate to duct regions 206, 207 and 208 as indicated schematically at 201. The sensor net is in communication with a control means 202 as shown at 203. The control means contains a computation device and an electrical means that functions to regulate the voltage and/or current provided to each electromagnet 205 via wire 204. For simplicity only one wire is shown, but it is understood that every electromagnet is connected to the control unit. The computation means includes means to store data on machine readable media and communicate data about the operation of electromagnets and sensor inputs (not shown). In some cases a plurality of permanent magnets (not shown) may be added to the arrangement shown to provide a bias field and the net magnetic field is the vector sum of the bias field and magnetic fields generated by electromagnets. This feature may reduce energy consumption in applications where the time average field has a preferred direction.

The object orientation region 206 is lined by an array of electromagnets 205 that operate to generate a magnetic field in different directions as indicated at 211, 212, 213, 214, and 215. The object orientation region may be partially enclosed by a non-magnetic wall 210 that functions to constrain object motion and provide mechanical support for the array of electromagnets 205. The number of electromagnets in the array is at least equal to the number of degrees of freedom of the object. The wall 210 may for example constrain the magnetic object 74 to move in a plane thereby eliminating one translational degree of freedom and possibly also hindering rotational degrees of freedom. Alternately, the object may be oriented in free space without contacting the wall 210 and the wall merely acts as a barrier in the event of irregular operation. The array of electromagnets may have a spatial extent determined by the translational velocity of an object and the required object throughput. In the simplest case in which objects have a translational velocity small enough that the magnetic field from any electromagnet is nearly constant within the distance traveled in the orientation region 206, as few as six electromagnets are required to orient an object with six degrees of freedom. Preferably the electromagnets are spaced and oriented to point to a common center and each occupies an equal solid angle. More electromagnets may be used to better define the direction of the net magnetic field. In the more general case in which the object translates through the zone of magnetic field from individual electromagnets during an orientation step, more electromagnets are required to provide a magnetic field in the space for each orientation step.

At each time interval in the orientation process, the force and torque on the object are proportional to the dot product between the applied magnetic field and the magnetic moment of the object and the forces and torques will tend to align the object with the applied magnetic field. With this consideration, the angle between the applied magnetic field and the magnetic moment of the object must be less than 90 degrees. At angles near 90 degrees the system is unstable and may rotate either toward or away from a desired orientation. Preferably the object is oriented in steps of 30 degrees or less.

As shown in FIG. 1, an object 221 is detected by detector 201 approaching a first magnetic zone indicated at 211 oriented at 30 degrees to the object direction of travel. In response to object position and orientation information from detector 201, control 202 switches on two or more electromagnets to generate magnetic field 211. The object is attracted to the region of highest magnetic flux in magnetic field 211 and experiences a torque toward alignment with the direction of the magnetic field. Detector 201 monitors the change in position of the object and before the object reaches the magnetic axis 211, control 202 switches off the magnetic field at 211 and causes the next magnetic axis at 212 to be switched on. The process is repeated to incrementally at 213, 214, and 215 to rotate the object to a desired orientation.

Figure 2:
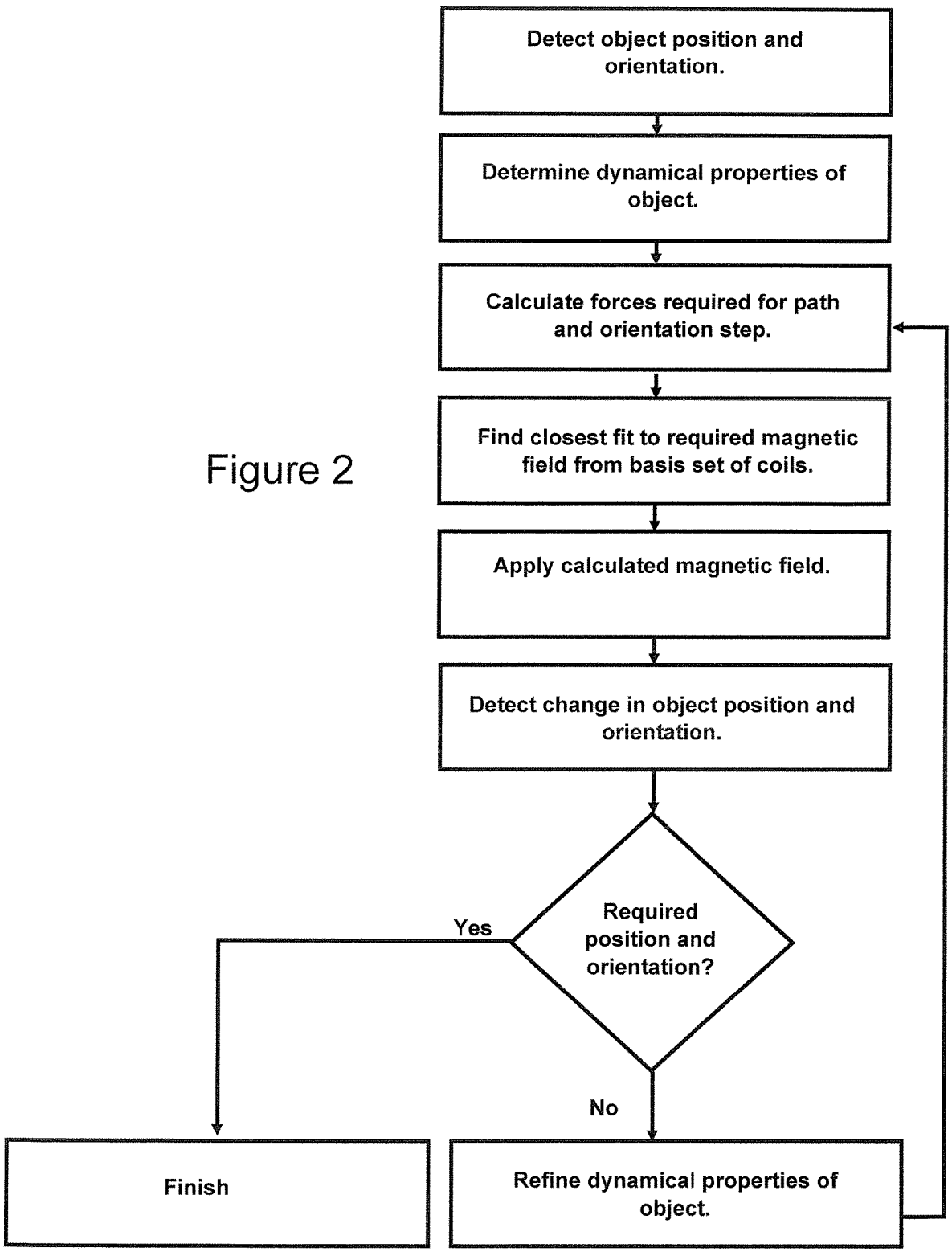
FIG. 2 is a flow chart for the operation of the magnetic orientation arrangement of FIG. 1.

FIG. 2 shows a deterministic algorithm for orienting objects in orientation region 206 of FIG. 1 by control device 202. The algorithm takes as input a required position, velocity and orientation for an object exiting the orientation region 206. In some embodiments, the algorithm calculates a series of waypoints intermediate between the entry and exit of orientation region 206 wherein each waypoint has a set of required position, velocity and orientation parameters. The waypoint parameters then become the required parameters in the context of this discussion. The algorithm begins with the detection of the position, velocity and orientation of an object entering orientation region 206. In the next step the dynamical properties of the object are determined. These include mass, shape, moments of inertia, and friction coefficients with surfaces and air resistance. In cases involving a series of similar or identical objects, the dynamical properties may be known from prior measurements and hence may be retrieved from a storage medium. In cases pertaining to objects with variable properties, the dynamical properties are determined by measuring the response of the object to known forces. For example, in an initial step known magnetic fields are applied for short time intervals in different (preferably orthogonal) directions and the response of the object to the field is observed by detector net 201. Control device 202 then calculates an initial set of dynamical properties from the observations. Based on the initial set of dynamical properties control device 202 calculates by classical dynamics the applied magnetic forces required to produce a change in position, velocity and orientation parameters toward required final or waypoint parameters. The algorithm next attempts to find a combination of inputs to the array of electromagnets that best approximates the required magnetic field and then generates that field. The detector 201 measures the change in position, velocity and orientation parameters of the object in response to the applied field and control device 202 calculates the difference between the actual and calculated parameters. The difference may be used to improve estimates of the dynamical parameters. This feature is particularly useful for magnetic objects with irregular shapes for which the initial dynamical properties based on a small number of measurements may have large uncertainties. If the position, velocity and orientation parameters are within a tolerance value of the required final parameters the algorithm terminates. Otherwise the algorithm performs another iteration of calculating required magnetic forces from classical dynamics, approximating the magnetic field with available electromagnets, applying the magnetic field for a short time interval and observing the result. It should be noted that in some cases a component of the generated field may be used simply to oppose the force of gravity and keep the object suspended in space and without friction with wall 210.

FIG. 1 schematically shows operation device 216 linked with and under the control of control device 202 via wire 217. There may be any number of discrete operation devices 216 performing different operations on magnetic objects in regions 206, 207, 208 and 209. There may be any number of different types of operation devices performing operations on magnetic objects in spatially distinct regions 206, 207, 208 and 209.

In some embodiments, the operation device 216 directs a radiation toward a portion of the magnetic object and the radiation causes a physical or chemical change at a location on the magnetic object. The radiation could for example heat, fuse, melt or oblate a portion of the magnetic object causing a physical change. The radiation could for example be used to photo polymerize a portion of the magnetic object causing a chemical change.

In some embodiments, operation device 216 adds a material to at least a portion of a magnetic object 221, 231, 241, 261 or 271. For example the added material could be a lubricant added to the threads of a screw or an ink marking added to the head of a screw.

FIG. 1 shows a magnetic gate arrangement in region 207 wherein a magnetic object 231 approaches a gate with three branches 232, 233, and 234, respectively. Detector 201 measures the position and velocity of object 231 and control 202 calculates the magnetic fields required to direct object 231 along one of paths 232, 233, and 234 selected by a required use of the object. As shown, electromagnets 235 and 236 may be used in combination to generate a magnetic field generally along path 232 with a transverse component. The control unit varies the transverse component to adjust for variation in the position and velocity of different objects 231 so as to steer each object along path 232 to tool 67. In some embodiments, a single electromagnet may be used to attract objects to each path. Similarly control 202 may activate electromagnets 237 and 238 to steer object 231 along path 233 toward buffer 240. Likewise control 202 may activate electromagnets 238 and 239 to steer object 231 along path 234 toward transport region 208.

Detector 201 detects the position and velocity of objects entering transport region 208 and control 202 activates an array of electromagnets at longitudinal positions 242, 243, 244, 245, 246, 247, 248, 249 and 250 along region 208 in sequence. In one embodiment, the array of electromagnets may operate as a linear stepper motor in that the object is attracted to and retained by each electromagnet for a user defined time interval before being transferred to the next electromagnet in the array. This feature is useful for applications in which objects must be delivered to an operation at the end of the line at specific time intervals. In another embodiment, the array operates as a linear motor. That is as object 241 approaches electromagnet 242, electromagnet 242 is switched on to attract object 241. Before object 241 reaches the position of electromagnet 242, electromagnet 242 is switched off and electromagnet 243 is switched on. The process is repeated until object 241 reaches the position of the last electromagnet in the array indicated at 250 in this example. Hence the object 241 may be transported stepwise, at constant velocity or accelerated toward the last array element 250. Control 202 may regulate the timing of electromagnet activation based on a dynamical calculation of object position, measurements from detector 201, or both. The distance between magnetic objects may be measured by detector 201 and the magnets in the array operated in a manner to either increase or decrease the distance between magnetic objects.

In another arrangement, detector 201 detects an object approaching air gap 209 and control 202 activates electromagnets 251 and 252 to impart a transverse velocity component on the object. The term "air gap" has the meaning of a region containing a medium that offers minimal drag forces to material passing through the region. In some embodiments the "air gap" may contain atmospheric air. In some embodiments the "air gap" may contain a non-reactive gas. In some embodiments the "air gap" may contain gas at a pressure below atmospheric pressure. In some embodiments the "air gap" may be a vacuum region with pressure for example less than 1E-5 Torr.

As shown at 261 in air gap 209, the object may be directed upward toward bin array 262. The motion of magnetic object 261 in the air gap 209 is monitored by detector 273 in communication with control device 202 by wire 274. In the scope of this document, the term "detector" refers to the plurality of detectors required by the described functions. In some embodiments, the object approaches the air gap from singulation feed 91. In other embodiments, air gap 209 may be preceded by an orientation region 206 and or transport region 208. The object 261 follows a ballistic trajectory toward an array of bins 262 and in the example shown falls into bin 263. That is the object can be directed in a specific orientation to a specific location within a conical region determined by the longitudinal and transverse velocities imparted on the object by electromagnets 242 to 252 inclusive and the direction and orientation of each object may be verified by detector 273. In some embodiments, objects are directed to different bins based in part on a measured parameter of the object.

In another arrangement, detector 201 detects an object approaching air gap 209 and control 202 activates electromagnets 251 and 252 to impart a transverse velocity component on object 271 shown in air gap 209. Magnetic object 271 follows a ballistic trajectory toward a workpiece 272 and performs an operation on workpiece 272. Detector 273 is operable to both confirm the trajectory and orientation of magnetic object 271 and the effect of the operation performed on workpiece 272. Optionally, subsequent to the operation performed on workpiece 272 the magnetic object shown schematically at 281 is collected and returned to singulation device 50 along path 282.

Radiation source 275 in communication with control device 202 by wire 276 directs a radiation which may be photons, electrons, neutrons, atoms, ions or molecules incident on a location of the workpiece 272. In the scope of this document, the term "radiation source" refers to the plurality of radiation sources required by the described functions. In some embodiments radiation source 275 may provide a radiation that is reflected, scattered, absorbed, or transmitted by workpiece 272 and subsequently detected by detector 273 to provide information about the interaction of object 271 with workpiece 272. For example, radiation source 275 may provide photons with wavelengths ranging between 400 nm and 1050 nm to illuminate the workpiece and proximate regions and the detector 273 is a camera with a photodiode array sensitive to said wavelength range. In other embodiments radiation source 275 may provide a radiation that causes a physical or chemical change in workpiece 272 coordinated with the arrival of an object 271. For example, the radiation source 275 could be a laser that irradiates and heats selected locations on workpiece 272 facilitating a chemical reaction between workpiece 272 and object 271. For example a region of workpiece 272 may be heated to facilitate fusion of object 271 with workpiece 272. For example, a region of workpiece 272 may be heated so the momentum of object 271 deforms or modifies the atomic structure of said region of workpiece 272.

As shown schematically in FIG. 1, a portion region 208 may pass through workpiece sections indicated at 27 and 28 and a magnetic object within the region may perform an operation on the workpiece 27 and 28. The choice of region 208 is for illustrative purposes only. Any part of regions 206, 207 or 208 may pass through a portion of a workpiece and perform an operation on the workpiece.

In FIGS. 3-8, all functional elements including magnetic arrays, light sources, detectors, sensors, and motors and displacement means are understood to be in communication with and controlled by control means 202. For simplicity, connections to control 202 are not explicitly shown.

Figure 3:
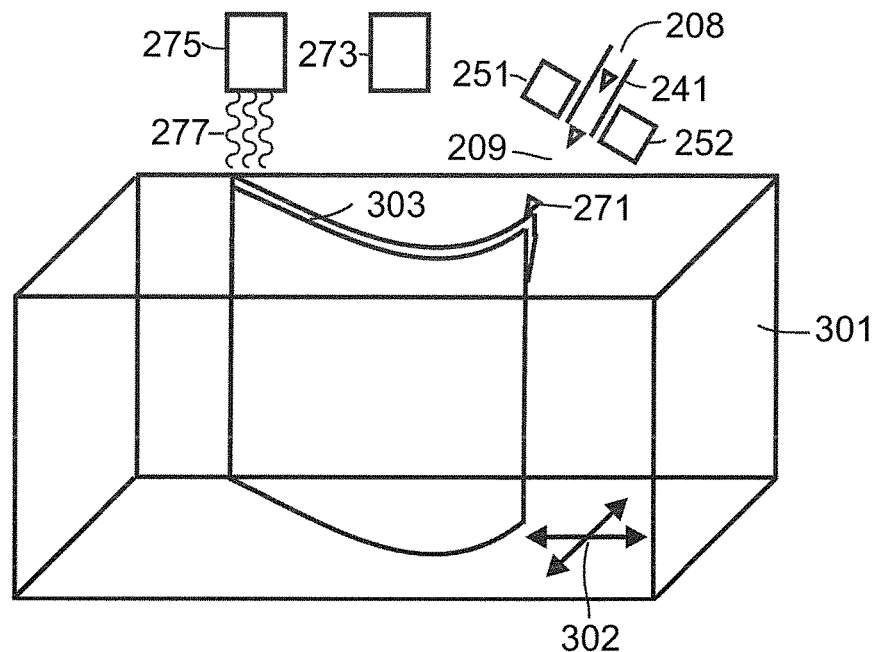
FIG. 3 is a schematic illustration of the arrangement of FIG. 1 used for performing a cutting operation on a workpiece.
Figure 4:
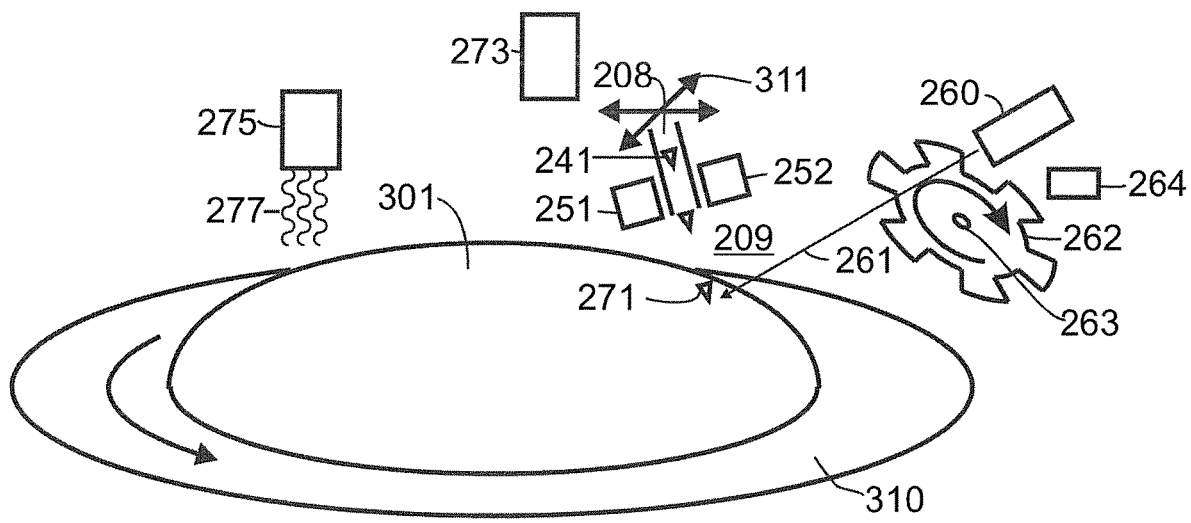
FIG. 4 is a schematic illustration of the arrangement of FIG. 1 used

FIGS. 3 and 4 are schematic illustrations of the arrangement of FIG. 1 used for machining a workpiece. FIG. 3 illustrates the arrangement of FIG. 1 used for cutting workpiece block 301. The magnetic object 241 in duct region 208 may be an oriented tool or an abrasive material with no preferred orientation. The magnetic object 241 is accelerated in duct 208 and directed through air gap 209 toward a location on workpiece 301 by steering magnets 251 and 252. As shown at 302, the workpiece block 301 may be translated to produce relative motion with respect to duct 208. The relative motion of the workpiece and duct combined with the direction vector of the magnetic object controlled by steering magnets 251 and 252 together determine the path 303 toward and within the workpiece the magnetic object 271 is incident upon to perform a cutting operation. Radiation source 275 illuminates the workpiece with coherent light 277. The impact and effect of magnetic object 271 are observed by light detector 273 in communication with control 202. Light detector 273 includes an interferometer that compares light reflected from the workpiece with a reference and control 202 uses information from detector 273 to calculate the change in depth of a cut by each magnetic object 271. Control 202 may use information about the impact and effect of each magnetic object on workpiece 301 to calculate the energy, momentum, and orientation of subsequent magnetic objects and to cause the required energy, momentum and orientation by activating magnetic fields as required along any part of the paths shown in FIG. 1. Control 202 may store information about each magnetic object, the magnetic fields used and the effect of impact on the workpiece on machine readable media and the information so collected may be used to optimize the fabrication process. In some embodiments, each magnetic object is controlled individually by feedback from detector 273 giving greater control and precision than prior art methods. In other embodiments, only the average parameters for a collection of magnetic objects are controlled. In this case, the method of the invention is similar in function to a water jet cutter with the advantage that magnetic levitation of the abrasive greatly reduces wear on the system transporting abrasive particles to the workpiece. Reduced wear translates to less down-time and expense for replacement of worn parts. In some embodiments, the region proximate to the cutting operation may be flushed with a stream of gas or liquid to remove cuttings and spent magnetic objects.

FIG. 4 illustrates another arrangement in which a stream of abrasive magnetic objects 241 from acceleration region 208 is directed toward workpiece 301 on rotating platform 310 across air gap 209 by electromagnets 251 and 252. The trajectory and effect of the abrasive magnetic objects on the workpiece is monitored by detector 273 with coherent illumination 277 from radiation source 275. As shown at 311, the acceleration region 208 may be translated relative to workpiece 301 such that abrasive magnetic particles can be directed toward any location on the surface of workpiece 301. In the example shown, the workpiece 301 is an optical element and detector 273 operates to measure the surface curvature by interferometry. The surface may be ground precisely by the present method because the momentum and orientation of each abrasive particle 271 incident on workpiece 301 can be calibrated by control means 202 to the amount of material to be removed. Radiation source 275 may provide radiation that heats a location on the workpiece allowing material to flow and smooth the surface after material is removed.

A stream of fluid 261 is produced by fluid source 260 and is directed toward a location on the workpiece proximate to the location on the workpiece impacted by abrasive magnetic objects. The stream of fluid is periodically interrupted by chopper 262 rotating about axis 263. Sensor 264 measures the angular displacement of the chopper and communicates said displacement to control means 202 (not shown). Control means 202 may regulate the angular speed and phase of chopper 262. Control means 202 generates signals causing magnetic objects to arrive at a workpiece location at different times than fluid streams.

It should be noted that there is no magnetic field that will provide an equilibrium position for the magnetic object as a consequence of the Earnshaw Theorem. It is however possible to oscillate the magnetic object 241 about a fixed point with small amplitude by rapidly adjusting the applied field to counter motion away from the fixed point. This method of dynamic balancing is used, for example in prior art magnetic bearings to balance forces about a single fixed point. In the present invention, the dynamic balancing is about points along an arbitrary curvilinear path specified by the user.

FIGS. 5, 6, 7 and 8 show schematic illustrations of the arrangement of FIG. 1 used for adding material to a workpiece. FIGS. 5, 6, 7 and 8 are directed toward adding material that is not in its final form (raw material). FIGS. 7 to 10 differ only in the details of material transport to the workpiece 272.

Figure 5:
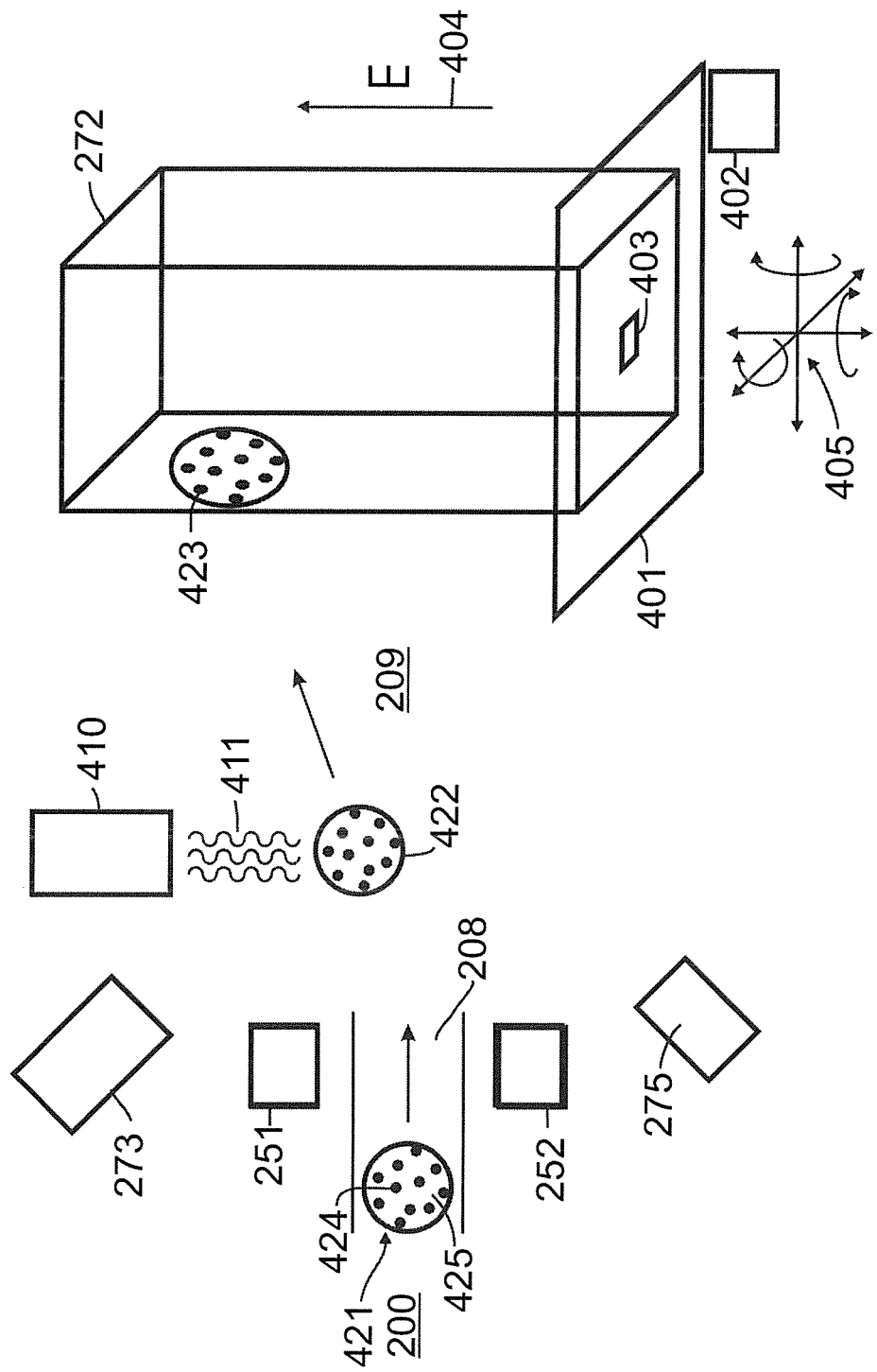
FIG. 5 is a schematic illustration of the arrangement of FIG. 1 used for adding material of a composite magnetic object to a workpiece.
Figure 6:
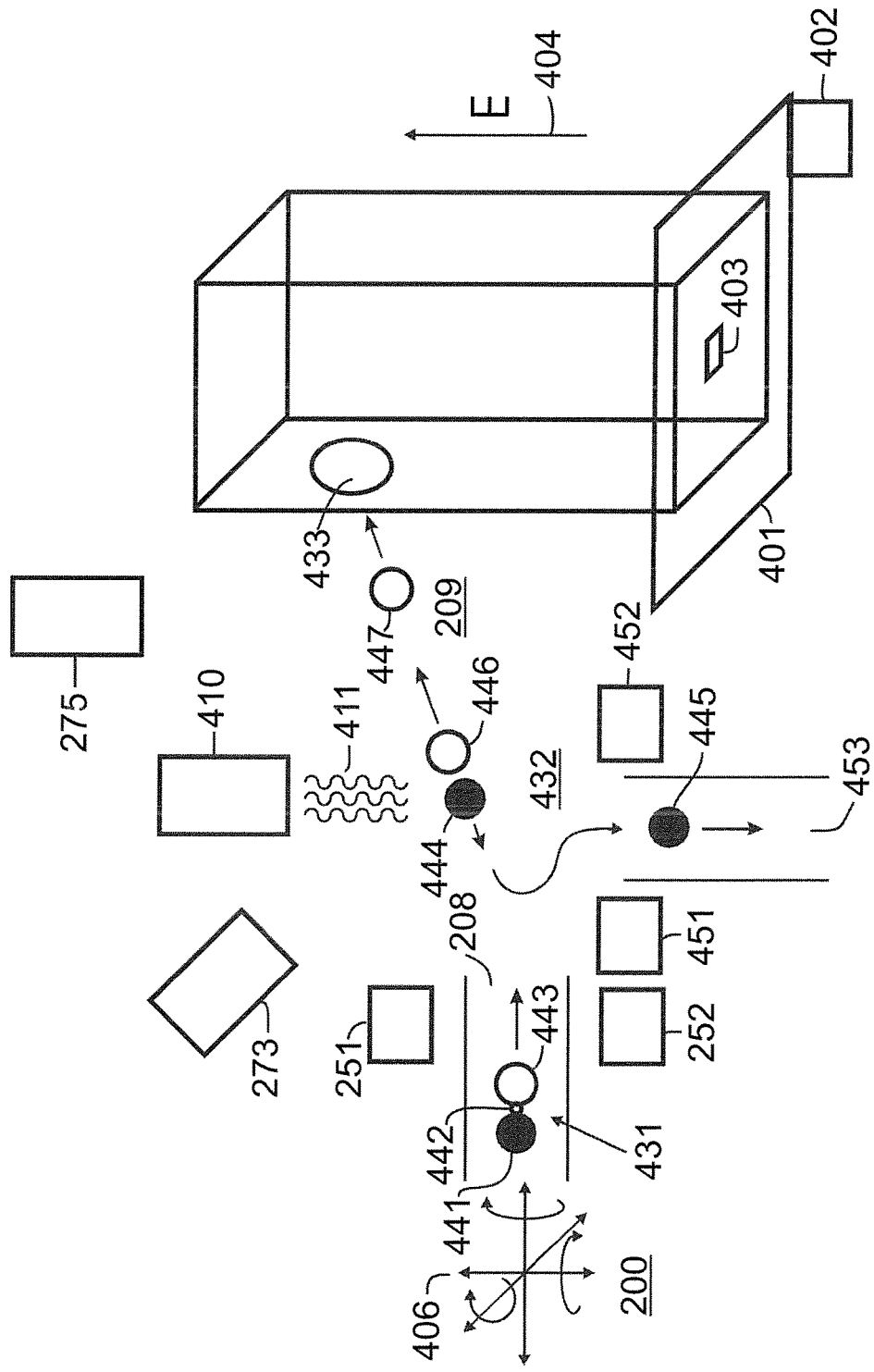
FIG. 6 is a schematic illustration of the arrangement of FIG. 1 used for adding non-magnetic material to a workpiece.
Figure 7:
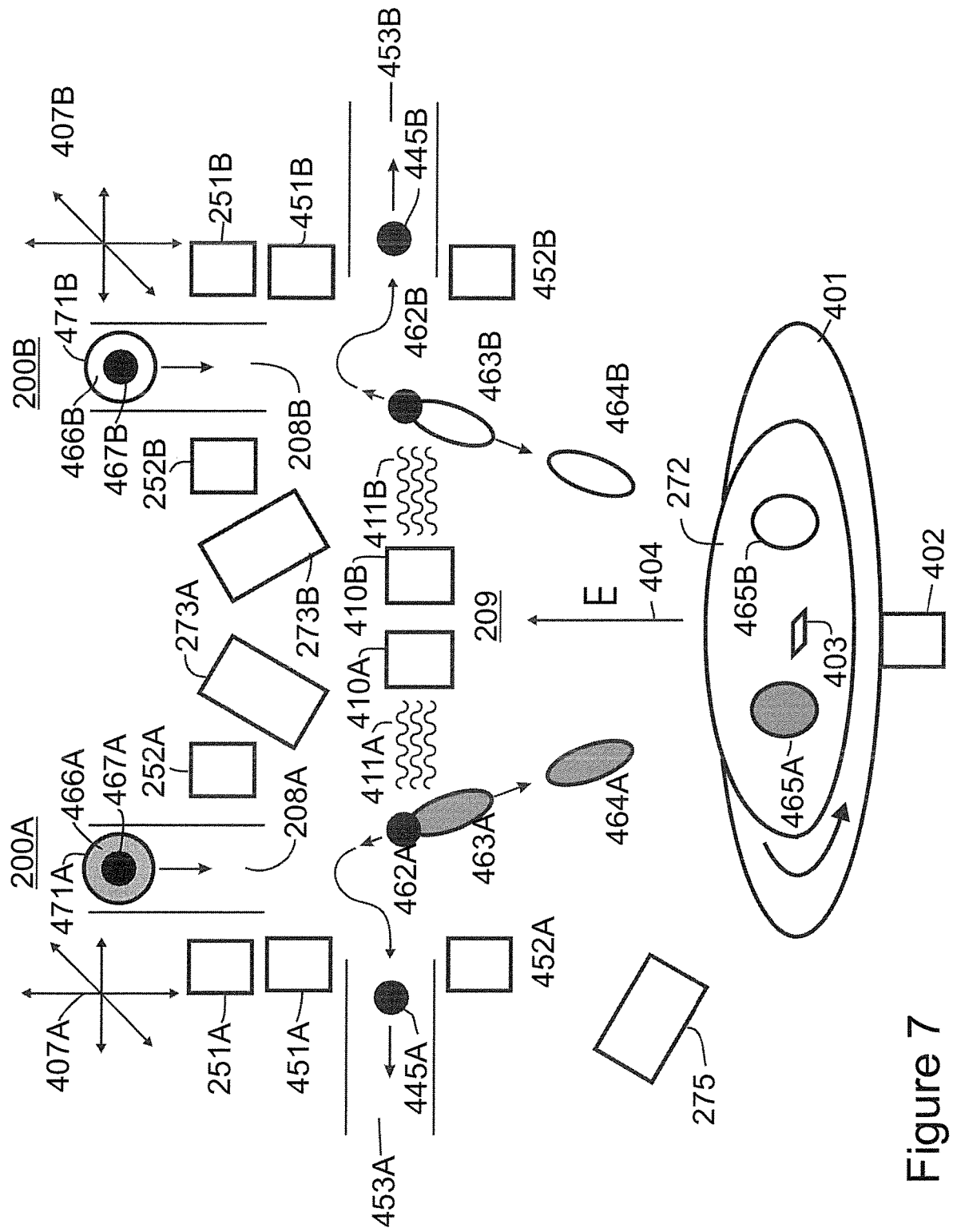
FIG. 7 is a schematic illustration of the arrangement of FIG. 1 used for adding two types of non-magnetic material to a workpiece.
Figure 8:
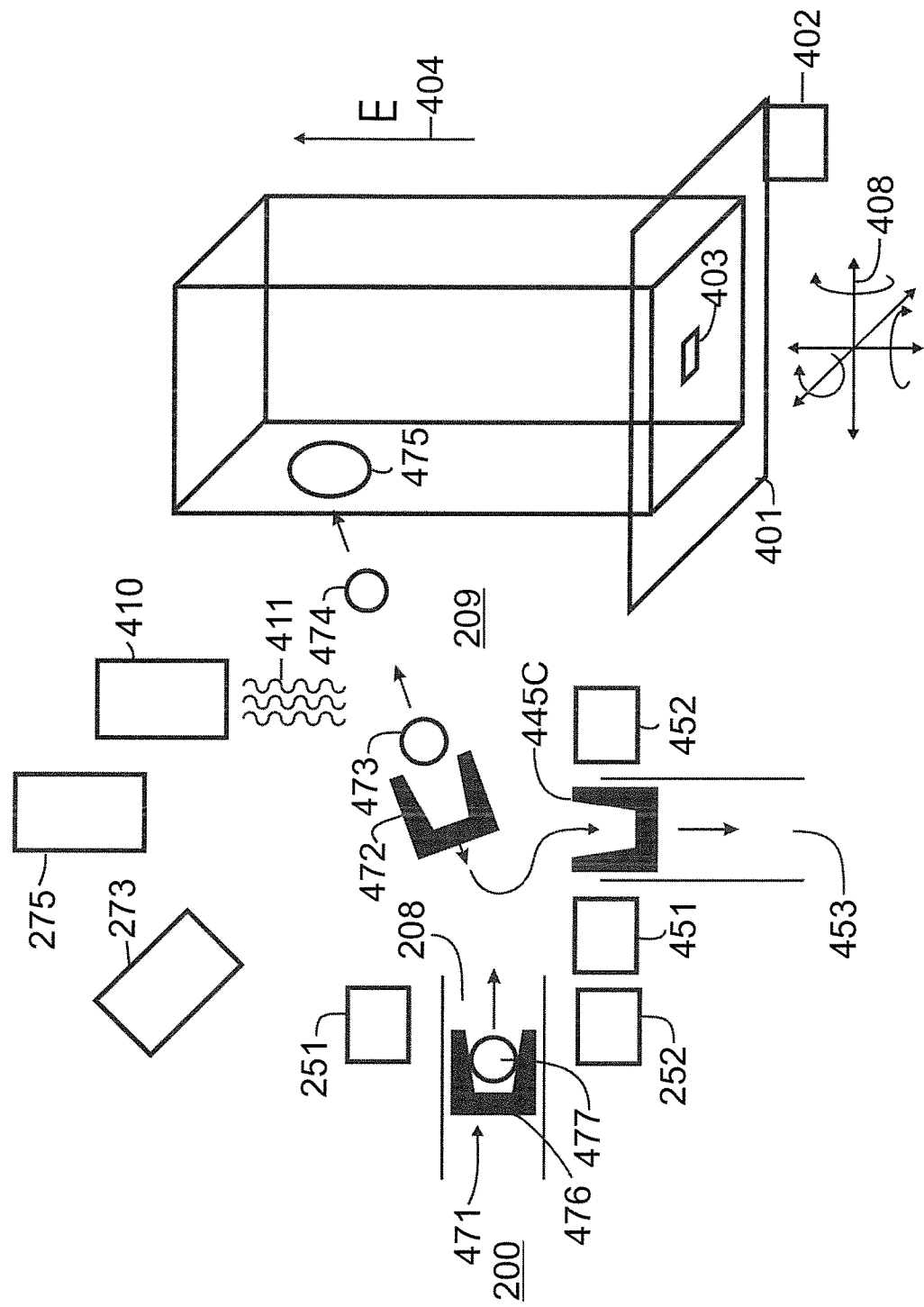
FIG. 8 is a schematic illustration of the arrangement of FIG. 1 used for adding non-magnetic material to a workpiece from a container.

FIGS. 5, 6 and 7 include the magnetic arrangement of FIG. 1 indicated schematically at 200 with a composite magnetic object directed by steering electromagnets 251 and 252 from region 208 of magnetic arrangement 200 across air gap 209 toward workpiece 272. In FIG. 7 two instances of the magnetic arrangement in FIG. 1 are shown at 200A and 200B to illustrate that a plurality of magnetic arrangements may be used to add material to a single workpiece. Each magnetic arrangement 200 may for example add a different type of material. Magnetic arrangement 200A includes steering electromagnets 251A and 252A directing composite magnetic object 471A from region 208A toward workpiece 272 across air gap 209. Magnetic arrangement 200B includes steering electromagnets 251B and 252B directing composite magnetic object 471B from region 208B toward workpiece 272 across air gap 209. In FIGS. 5 to 8 workpiece 272 is mounted on platform 401 with integral temperature controller 402. Temperature controller 402 is operable to regulate the temperature of different locations of workpiece 272 to different values. Workpiece 272 may be fabricated on an oriented seed crystal as shown at 403 and the region proximate to workpiece may have an applied external electric field as shown at 404. The electric field may be set to favor crystallization in a selected direction or along a particular crystallographic axis if seed crystal 403 is present. In FIGS. 5, 6 and 7 air gap 209 is illuminated by radiation device 275 and the trajectory of the composite magnetic object in air gap 209 is measured by detector 273 and transmitted to control device 202. Control device 202 compares the measured and calculated trajectories and adjusts outputs to steering magnets 251 and 252 to minimize the difference for subsequent composite magnetic objects. In FIG. 7 there are two detectors 273A and 273B measuring the trajectories of composite magnetic objects projected from magnetic arrangements 200A and 200B, respectively. Control device 202 adjusts the steering magnet parameters of each magnetic arrangement in response to measurements from detectors 273A and 273B. The detectors 273, 273A, and 273B also operate to measure changes in properties of workpiece 272 as material is added and control device 202 uses the measured properties to regulate the addition of material and the temperature at which material is added at each location via temperature control 402. FIGS. 5, 6 and 8 schematically show radiation source 410 directing radiation 411 toward a composite magnetic object. In FIG. 7 there are two independent radiation sources 410A and 410B providing radiation 411A and 411B. The radiation 411, 411A and 411B may for example be a laser, a radio frequency source or a black body radiator operable to deposit energy in, and change the temperature of a composite magnetic object. Radiation source 275 is used for illumination whereas radiation sources 410, 410A and 410B are used to perform an operation on the magnetic object.

In FIG. 5 composite magnetic object 421 comprised of a ferromagnetic material 424 embedded in a weakly magnetic material 425 is accelerated by array of electromagnets 242 through 250 (see FIG. 1) in region 208 and is deflected toward a target location 423 on workpiece 272 by deflection magnets 251 and 252. As indicated at 405, the platform 401 may rotate through any angle and translate in any direction so as to expose any surface of workpiece 272 for addition of material. Detector 273 in communication with control device 202 may track the trajectory of composite magnetic object 421 through air gap 209 to target location 423 on workpiece 272 and use the information to adjust the operating parameters of deflector magnets 251 and 252 to improve the precision of placement for subsequent composite magnetic objects 421. Radiation source 275 illuminates workpiece 272 and information about the reflected radiation received by detector 273 is processed to provide information about the shape workpiece 272. A radiation source 410 in communication with control device 202 directs radiation 411 onto composite magnetic object 422 in air gap region 209. The radiation 411 may heat, soften or melt composite magnetic object 422 to facilitate its merger with workpiece 272. The composite magnetic object 422 may be heated to a temperature above the Curie temperature of its ferromagnetic components 424 in air gap 209 with no effect on the ballistic trajectory already established. Detector 273 may also operate to monitor the merger of material in composite magnetic object 422 with workpiece 272. Workpiece 272 is mounted on a platform shown schematically at 401 which may have six degrees of freedom as shown at 405 to adjust the relative positions of pathway 208 and workpiece 272. The platform 401 can be for example may include a goniometer to provide angular degrees of freedom and an XYZ translation stage to provide translational degrees of freedom.

The translation and rotation of platform 401 can be used to bring a sequence of locations on workpiece 272 within the conical zone accessible by adjusting steering magnets 251 and 252 for path region 208. The platform 401 may further include a thermal control device 402 operable to regulate the temperature of location 423 receiving material. The temperature may be set, for example to react, melt, anneal or fuse material added by composite magnetic object 421 to workpiece 272. The arrangement of FIG. 5 may be used to 3D print a metallic structure. The composition of the metallic structure may be varied spatially by directing composite magnetic objects with different composition to different locations. Atoms from the added material will diffuse into the bulk of the workpiece with kinetics determined by the temperature and the local ordering of atoms. In some embodiments an external electric field as shown at 404 is applied to the workpiece. The electric field provides a preferred direction for crystal growth. The advantage of this method is that almost any solid material can be mixed with ferromagnetic particles and pressed, fused or melted into an object with dynamical properties influenced by the interaction of an external magnetic field with the ferromagnetic particles contained therein. The scope of the invention includes the concept of composite magnetic objects for the purpose of influencing dynamics, but does not include methods that may be used to fabricate composite magnetic objects.

In FIG. 6 composite magnetic object 431 is comprised of a ferromagnetic particle 441, a joining element 442 and a payload element 443. Composite magnetic object 431 is accelerated by array of electromagnets 242 through 250 in region 208 and is deflected toward a target location 433 on workpiece 272 by deflection magnets 251 and 252. As indicated at 406, the magnetic apparatus may translate in any direction so that material can be added to any surface of workpiece 272. In air gap 209 at 432 joining element 442 is removed by radiation 411 so that ferromagnetic particle 441 and payload element 443 travel independently on the same trajectory. The radiation at 411 at 432 may also heat and possibly melt the payload particle 446 which proceeds as a liquid drop at 447 to target location 433. Depending on the temperature at 433, the liquid drop may be quenched to a glassy state or added to a crystalline region. Following removal of the joining element 442, a second array of electromagnets shown at 451 and 452 attract the ferromagnetic particle 441 into duct 453 from which it may be recycled to form another composite magnetic object. The payload particle 446 continues along the trajectory set for the composite magnetic object 431 in region 208 as shown at 447. The joining element 442 may for example be glue or a substance with melting point below the Curie temperature of the ferromagnetic particle 441. A second radiation source (not shown) may irradiate workpiece 272 with doping atoms or ions to change the electronic properties of added material.

In FIG. 7 composite magnetic object 471A is comprised of a ferromagnetic core 467A enclosed by first shell material 466A. Similarly, composite magnetic object 471B is comprised of a ferromagnetic core 467B enclosed by second shell material 466B. Composite magnetic object 471A is accelerated by an array of electromagnets in region 208A and directed toward location 465A on workpiece 272 by steering electromagnets 251A and 252A. As indicated at 407A, the magnetic apparatus 200A may translate in any direction so that material can be added to any surface of workpiece 272. Composite magnetic object 471B is accelerated by an array of electromagnets in region 208B and directed toward location 465B on workpiece 272 through air gap 209 by steering electromagnets 251B and 252B. As indicated at 407B, the magnetic apparatus 200B may translate in any direction so that material can be added to any surface of workpiece 272. In air gap region 209 composite magnetic objects are irradiated by radiation 411A and 411B respectively from radiation sources 410A and 410B. The radiation 411A incident on composite magnetic object 471A causes a reduction in the viscosity of first shell material 466A and subsequent to the reduction in viscosity array of electromagnets 451A and 452A attract ferromagnetic core 462A toward duct region 453A from which it may be recycled into another composite magnetic object 445A. The residual viscosity of the shell material 466A combined with the magnetic attraction acting on ferromagnetic particle 467A causes the shell material and ferromagnetic core 462A to separate and the shell material to elongate as shown at 463A. The elongated shell material continues toward the target location 465A on workpiece 272 as shown at 464A. The radiation 411B incident on composite magnetic object 471B causes a reduction in the viscosity of first shell material 466B and subsequent to the reduction in viscosity array of electromagnets 451B and 452B attract ferromagnetic core 462B toward duct region 453B from which it may be recycled into another composite magnetic object 445B. The residual viscosity of the shell material 466B combined with the magnetic attraction acting on ferromagnetic particle 467B causes the shell material and ferromagnetic core 462B to separate and the shell material to elongate as shown at 463B. The elongated shell material continues toward the target location 465B on workpiece 272 as shown at 464B. The shell materials 466A and 466B can for example be different optical glasses with melting points below the Curie temperature of the ferromagnetic cores 467A and 467B. The electromagnet array 451A and 452A operable in air gap 209 preferably generate a first magnetic field to attract ferromagnetic core 467A in a direction opposite to the direction of composite magnetic object 471A. This will result in a viscosity drag and reduction of speed for first shell material 466A, but not a change in direction. The electromagnet array 451B and 452B operable in air gap 209 preferably generate a first magnetic field to attract ferromagnetic core 467B in a direction opposite to the direction of composite magnetic object 471B. This will result in a viscosity drag and reduction of speed for first shell material 466B, but not a change in direction. After the respective ferromagnetic cores are separated from the shell material, the ferromagnetic cores may follow a path with a component transverse to the initial path. Alternately, the ferromagnetic cores may be separated from the shell material in any direction provided that the control device 202 performs a dynamical calculation that compensates for the transverse viscous drag due to core separation by adjusting the initial trajectory of the composite magnetic object. The first shell material 466A is incident on workpiece 272 at location 465A and the second shell material 466B is incident on workpiece 272 at location 465B. Workpiece 272 is mounted on a rotating platform 401 facilitating the fabrication of items with rotational symmetry such as a lens. Radiation source 275 controlled by control device 202 illuminates the lens with a sequence of different wavelengths and the refraction is measured by detectors 273A and 273B and analyzed by control 202. Control device 202 stores information about the material added and the optical properties of the lens on a machine readable storage medium. Subsequently the stored information is used for quality assurance and to optimize the fabrication process.

FIG. 8 shows an arrangement wherein composite magnetic object 471 is comprised of a payload object 477 partially enclosed by ferromagnetic container 476. Ferromagnetic container 476 includes a delivery channel aligned along a delivery axis through which the payload object can exit the container. In some embodiments the ferromagnetic container 476 includes a plurality of magnetic domains with different magnetic moments wherein at least one domain obstructs the delivery channel and retains the payload object 477 in the presence of a first external magnetic field and does not obstruct or retain the payload object 477 in the presence of a second external magnetic field. In other embodiments, the payload object 477 is retained in ferromagnetic container 476 by inertial forces. The composite magnetic object 471 is accelerated in duct 208 and directed toward location 475 on workpiece 272 by steering electromagnet array represented at 251 and 252. After composite magnetic object 471 enters air gap 209, a magnetic field is generated in air gap region 209 by a second electromagnet array indicated at 451 and 452 that acts to attract ferromagnetic container 472 to position 445C in duct 453. Magnetic field in air gap region 209 accelerates ferromagnetic container 472 in a direction opposite to the direction of composite magnetic object 471 until the ferromagnetic container 472 and payload object 473 are spatially separated thereby leaving the momentum of payload object 473 unaltered. Subsequently, payload object 473 may receive radiation 411 and change physical state as represented at 474. Radiation 411 may for example reduce the viscosity of payload object 473 by adding heat energy. The momentum transferred by the radiation (typically photons) is vanishingly small compared with the momentum of the payload object 473 so that the payload object at 474 has substantially the same momentum and direction as the payload object at 473. Payload object continues to target location 475 and is added to workpiece 272. As indicated at 408, workpiece 472 may mounted on a platform 401 with six degrees of freedom.

The arrangements of FIGS. 5 to 8 may be used to fabricate three dimensional electronic devices by adding material with differing electron and hole concentrations to the workpiece 272. Alternately, the added material may diffuse into pre-existing material of the workpiece and thereby alter the electron and hole concentrations. The electronic device may be for example a transistor or an array of transistors with an arrangement of connections that may be difficult to achieve with conventional lithography methods.

The arrangements of FIGS. 5 to 8 may be used to fabricate conventional optics such as mirrors, prisms, lenses and gratings as well as optical devices with novel properties. For example, photonic crystals may be fabricated by adding material with differing refractive index in regular patterns. For example, gradient index optics may be fabricated in which the refractive index varies non-linearly in multiple directions. For example, three-dimensional optical computing devices may be fabricated. For example, an optical modulator as described in PCT publication WO 2018/213923 published 29 Nov. 2018 by the present inventors may be fabricated. For example, surface features can be fabricated to enhance spectral signals.

The arrangements of FIGS. 5 to 8 may be used as an alternative to lithography to fabricate opto-electric devices such as LEDs and photodiodes.

In a particularly useful arrangement, a single crystal can be grown by the arrangements shown in FIG. 3 by adding material via a sequence of composite magnetic objects to an oriented single crystal seed 403 wherein the single crystal seed is maintained at a temperature slightly below the crystal melting point and material is added at a temperature slightly above the crystal melting point and allowed to cool slowly in the presence of the seed crystal. This method differs from the well known Bridgeman method insofar as the interface layer between crystal and liquid states is exposed and can be monitored directly by detector 273 to provide feedback. That is radiation source 275 may provide collimated neutrons or x-rays incident on the workpiece to produce a diffraction pattern The diffraction pattern of the new layer can be monitored by detector 273 and analyzed by control 202 during cooling. If the diffraction pattern is consistent with the diffraction pattern of the seed crystal more material is added and if inconsistent, the surface layer is re-heated. Further, the crystal growing crystal face may have a spatial extent much greater than the area covered by the material from a single composite magnetic object. In this case material can be added selectively at locations where crystallization of new material is complete while other regions are annealed.

The invention claimed is:

1. A method for feeding magnetic objects in a stream from a massed supply of the objects, the method comprising:
   supplying the massed supply of the magnetic objects;
   forming the magnetic objects into a moving stream of the magnetic objects which are singulated each from the next where the moving stream comprises a single row of the magnetic objects in which the magnetic objects in the single row are spaced each from a next to form a space therebetween;
   wherein the magnetic objects are fed from the moving stream to a supply path;
   wherein there is provided a series of electromagnets along the supply path operated to provide a sequence of magnetic fields along the supply path that exert a force on each of the magnetic objects as each magnetic object passes in the single row separately from the magnetic objects in front and behind in the single row;
   and directing each of the magnetic objects in the single row by the series of electromagnets in a required direction toward a required location.

2. The method according to claim 1 wherein the magnetic objects in the stream are singulated each from the next in the row of the stream by passage along a singulation duct which rotates around a rotation axis transverse to the duct.

3. The method according to claim 1 wherein the series of electromagnets are operated sequentially so that each is turned off as the next is activated.

4. The method according to claim 1 wherein the electromagnets are spaced at equal intervals surrounding a path followed by the magnetic objects.

5. The method according to claim 1 wherein each of the magnetic objects is a composite magnetic object which comprises a first operating portion which is non ferromagnetic and a second magnetic ferromagnetic portion;
   wherein the first operating portion has a composition different from the second magnetic portion so that the first operating portion has a difference in interaction with the sequence of magnetic fields from an interaction with the sequence of magnetic fields of the second magnetic portion;
   wherein at least some of the first operating portion of the magnetic object is separated from the second magnetic portion of the magnetic object prior to reaching the required location;
   and wherein the first operating portion is carried to the required location while the second magnetic portion is carried along a different path different from the required location by the difference in interaction with the sequence of magnetic fields.

6. The method according to claim 1 wherein the supply path includes a guide surface of a duct along which the magnetic objects move.

7. The method according to claim 1 wherein the series of electromagnets acts to drive the magnetic objects along the supply path at a controlled rate.

8. The method according to claim 1 wherein the method is arranged for carrying out an operation on a workpiece and wherein the magnetic objects comprise magnetic operating tools which are moved toward the workpiece so as to carry out the operation on the workpiece by interaction of the magnetic operating tools with the workpiece at required positions on the workpiece at said required location.

9. The method according to claim 8 wherein the magnetic operating tools are inspected by a detector and parameters relating to the suitability of the tool are measured.

10. The method according to claim 9 wherein, depending on the measured parameters, the magnetic operating tool is diverted from use.

11. The method according to claim 9 wherein, depending on the measured parameters, the magnetic operating tool is operated on by the series of electromagnets to change the velocity of the magnetic operating tool.

12. The method according to claim 8 wherein, subsequent to the operation, the magnetic operating tool is recovered and directed to the massed supply for re-use.

13. The method according to claim 8 wherein a first sequence of magnetic fields drives a first of the magnetic operating tools to a first location on the workpiece, where the interaction of the first tool with the workpiece causes a change in the workpiece measured by a detector, and wherein a second sequence of magnetic fields drives a second of the magnetic operating tools to a second location on the workpiece which depends at least in part on the change in the workpiece measured by the detector.

14. The method according to claim 8 wherein at least a part of the supply path is integral to the workpiece.

15. The method according to claim 8 wherein a lubricant/purge material is supplied to the magnetic operating tools and/or to the workpiece.

16. The method according to claim 15 wherein the lubricant/purge material is supplied to the workpiece such that the lubricant/purge material and the magnetic operating tools arrive at different times.

17. The method according to claim 16 wherein a stream of the lubricant/purge material is modulated by a chopper wheel that periodically blocks flow.

18. The method according to claim 8 wherein each of the magnetic operating tools is comprised at least in part of an additive material arranged to be applied to the workpiece.

19. The method according to claim 18 wherein the additive material is melted and to be added to the workpiece.

20. The method according to claim 18 wherein the additive material comprises a plurality of different types of material.

21. The method according to claim 18 wherein the additive material is added to the workpiece in a three-dimensional printing process.

22. The method according to claim 18 wherein the function of the added material may depend at least in part upon the structure of the underlying substrate.

23. The method according to claim 8 wherein relative motion is provided between the magnetic object and workpiece which may be rotational, translational or a combination.

24. The method according to claim 23 wherein the workpiece further translates and/or rotates relative to the sequence of magnetic fields.

25. The method according to claim 8 wherein the series of electromagnets is arranged such that the sequence of magnetic fields includes at least a portion which translates and/or rotates within a defined volume containing at least part of the workpiece.

26. A method for feeding magnetic objects in a stream from a massed supply of the objects, the method comprising:
supplying the massed supply of the magnetic objects;
forming the magnetic objects into a moving stream of the magnetic objects which are singulated each from the next where the moving stream comprises a single row of the magnetic objects in which the magnetic objects in the single row are spaced each from a next to form a space therebetween;
wherein the magnetic objects are fed from the moving stream to a supply path;
wherein there is provided a series of electromagnets along the supply path operated to provide a sequence of magnetic fields along the supply path that exert a force on each of the magnetic objects as each magnetic object passes in the single row separately from the magnetic objects in front and behind in the single row;
and directing each of the magnetic objects in the single row by the series of electromagnets in a required direction toward a required location;
wherein the series of electromagnets operate, while directing each of the magnetic objects in the stream toward the location, also to change an orientation of at least some of the magnetic objects in the stream relative to the row of the magnetic objects by rotation of said at least some of the magnetic objects around an axis passing therethrough.

27. The method according to claim 26 wherein, in cases where a change in orientation of more than 30 degrees is required, the magnetic field is applied in a sequence of steps of 30 degrees or less wherein the magnetic moment of the magnetic objects approaches alignment with the applied magnetic field prior to the following step.

28. The method according to claim 26 wherein the electromagnets are spaced at equal solid angles about the center of mass of the magnetic object at any instant during said change in orientation.

29. A method for feeding magnetic objects in a stream from a massed supply of the objects, the method comprising:
supplying the massed supply of the magnetic objects;
forming the magnetic objects into a moving stream of the magnetic objects which are singulated each from the next where the moving stream comprises a single row of the magnetic objects in which the magnetic objects in the single row are spaced each from a next to form a space therebetween;
wherein the magnetic objects are fed from the moving stream to a supply path;
wherein there is provided a series of electromagnets along the supply path operated to provide a sequence of magnetic fields along the supply path that exert a force on each of the magnetic objects as each magnetic object passes in the single row separately from the magnetic objects in front and behind in the single row;
directing each of the magnetic objects in the single row by the series of electromagnets in a required direction along a path toward a required location;
and using at least one sensor to measure at least one property or parameter of at least some of the magnetic objects while in the row of the stream and while separated each from the next;
wherein the series of electromagnets acts to direct at least some of the magnetic objects along different paths at least in part in response to said at least one measured property or parameter of the magnetic object.

30. The method according to claim 29 wherein the sequence of magnetic fields acts to drive at least some of the magnetic objects along different paths at least in part in response to a user input.

31. The method according to claim 29 wherein the sequence of magnetic fields acts, at an end of a duct defining the supply path, to drive the magnetic objects along ballistic paths.

32. The method according to claim 29 wherein said at least one sensor operates for detecting characteristics of each of the magnetic object in a plurality of orientations of each magnetic object.

33. A method for feeding magnetic objects in a stream from a massed supply of the objects, the method comprising:
supplying the massed supply of the magnetic objects;
forming the magnetic objects into a moving stream of the magnetic objects which are singulated each from the next;
wherein the magnetic objects are fed from the moving stream to a supply path;
wherein there is provided a series of electromagnets along the supply path operated to provide a sequence of magnetic fields along the supply path that exert a force on the magnetic objects;
and directing the magnetic objects by the series of electromagnets in a required direction toward a required location,
wherein each of the magnetic objects is a composite magnetic object which comprises a first operating portion and a second magnetic portion;
wherein the first operating portion has a composition different from the second magnetic portion so that the first operating portion has a difference in interaction with the sequence of magnetic fields from an interaction with the sequence of magnetic fields of the second magnetic portion;
wherein at least some of the first operating portion of the magnetic object is separated from the second magnetic portion of the magnetic object prior to reaching the required operating location;
and wherein the first operating portion is carried to the required location while the second magnetic portion is carried along a different path different from the required location by the difference in interaction with the sequence of magnetic fields.

34. A method for feeding magnetic objects in a stream from a massed supply of the objects, the method comprising:
supplying the massed supply of the magnetic objects;
forming the magnetic objects into a moving stream of the magnetic objects which are singulated each from the next;
wherein the magnetic objects are fed from the moving stream to a supply path;
wherein there is provided a series of electromagnets along the supply path operated to provide a sequence of magnetic fields along the supply path that exert a force on the magnetic objects;
and directing the magnetic objects by the series of electromagnets in a required direction toward a required location, wherein the method is arranged for carrying out an operation on a workpiece and wherein the magnetic objects comprise magnetic operating tools which are moved toward the workpiece so as to carry out the operation on the workpiece by interaction of the magnetic operating tools with the workpiece at required positions on the workpiece at said required location;

and wherein the series of electromagnets is arranged such that the sequence of magnetic fields includes at least a portion contained within which translates and/or rotates within a defined volume containing at least part of the workpiece.

\* \* \* \* \*